(12) United States Patent
Jukes

(10) Patent No.: US 9,482,567 B2
(45) Date of Patent: Nov. 1, 2016

(54) METHOD OF OPERATING A CORIOLIS MASS FLOWMETER AND COIL FOR USE IN SAID METHOD

(71) Applicant: Krohne AG, Basel (CH)

(72) Inventor: Edward Jukes, Wellingborough (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/600,252

(22) Filed: Jan. 20, 2015

(65) Prior Publication Data

US 2015/0198473 A1    Jul. 16, 2015

Related U.S. Application Data

(62) Division of application No. 13/362,408, filed on Jan. 31, 2012, now Pat. No. 8,943,899.

(30) Foreign Application Priority Data

Mar. 7, 2011  (DE) .................. 10 2011 013 263

(51) Int. Cl.
*G01F 1/84* (2006.01)
*G01F 1/58* (2006.01)
*H01F 5/00* (2006.01)

(52) U.S. Cl.
CPC .............. *G01F 1/849* (2013.01); *G01F 1/58* (2013.01); *G01F 1/8422* (2013.01); *G01F 1/8495* (2013.01); *H01F 5/00* (2013.01)

(58) Field of Classification Search
CPC ........ G01F 1/58; G01F 1/8422; G01F 1/849; G01F 1/8495; H01F 5/00
See application file for complete search history.

(56) References Cited

U.S. PATENT DOCUMENTS

| | | | | |
|---|---|---|---|---|
| 3,094,870 A | * | 6/1963 | Mittelmann | G01F 1/58 310/11 |
| 3,316,762 A | * | 5/1967 | Westersten | A61B 5/0265 327/407 |
| 3,805,768 A | * | 4/1974 | Barefoot | G01F 1/58 600/504 |
| 4,079,626 A | | 3/1978 | Gardner | |
| 4,920,795 A | * | 5/1990 | Codazzi | G01F 1/58 73/195 |
| 5,309,050 A | | 5/1994 | Morinigo et al. | |
| 5,321,991 A | * | 6/1994 | Kalotay | G01F 1/8422 73/861.357 |
| 5,488,870 A | | 2/1996 | Yoshimura et al. | |
| 5,854,430 A | | 12/1998 | Drahm et al. | |
| 7,216,550 B2 | | 5/2007 | Lesjak et al. | |
| 7,394,340 B2 | | 7/2008 | Kakehashi et al. | |

(Continued)

FOREIGN PATENT DOCUMENTS

| | | |
|---|---|---|
| DE | 43 27 052 A1 | 2/1995 |
| DE | 100 46 275 A1 | 3/2002 |

*Primary Examiner* — Mohamad Musleh
(74) *Attorney, Agent, or Firm* — David S. Safran

(57) ABSTRACT

A method of operating a Coriolis mass flowmeter in which common or even great forces for oscillation excitation can be guaranteed, and at the same time, with which the risk of flashover is reduced in explosion-proof surroundings is implemented using an actuator assembly (4) that has at least a first conductor (11) with windings (12) and at least a second conductor (13) with windings (14), the windings of the conductors being arranged parallel to one another and insulated from one another at least in the area of their windings (12, 14), in which the first conductor and the second conductor are supplied with current that is at least temporarily in the same direction in the operating state, and a common magnetic field is created in which partial magnetic fields of the conductors are structurally superimposed.

9 Claims, 4 Drawing Sheets

(56) References Cited

U.S. PATENT DOCUMENTS

| | | |
|---|---|---|
| 7,628,080 B1 | 12/2009 | Feller |
| 8,471,663 B2 | 6/2013 | Cho et al. |
| 2002/0125974 A1 | 9/2002 | Cage |
| 2005/0139015 A1* | 6/2005 | Gebhardt .............. G01F 1/8409 73/861.357 |
| 2007/0000334 A1 | 1/2007 | Bitto et al. |
| 2010/0271159 A1 | 10/2010 | Poon et al. |
| 2012/0048034 A1* | 3/2012 | Hussain ................ G01F 1/8495 73/861.357 |
| 2012/0079891 A1* | 4/2012 | Hussain ................ G01F 1/8413 73/861.357 |

* cited by examiner

METHOD OF OPERATING A CORIOLIS MASS FLOWMETER AND COIL FOR USE IN SAID METHOD

CROSS REFERENCE TO RELATED APPLICATION

This application is a division of commonly owned, U.S. patent application Ser. No. 13/362,408, filed Jan. 31, 2012, now U.S. Pat. No. 8,943,899.

BACKGROUND OF THE INVENTION

1. Field of the Invention

The invention relates to a method for operating a Coriolis mass flowmeter with at least one actuator assembly, wherein the actuator assembly includes a coil with a first conductor and a second conductor at least windings of the first conductor and windings of the second conductor running parallel to each other, and wherein the first conductor and the second conductor are insulated from each other at least in the area of the windings.

2. Description of Related Art

Mass flowmeters using the Coriolis principle have been known for many years and allow for determination of the mass flow rate of the medium flowing through the measuring tube with high accuracy. In order to determine the mass flow rate, the measuring tube having an actuator assembly or also multiple actuator assemblies is excited to oscillation—in particular, with the eigenfrequency of a certain eigenform of oscillation—and the resulting oscillations are detected by sensor assemblies and then evaluated. The oscillation excitation of the measuring tube and the detection of the oscillation can occur in different manners. According to a common method, the actuator assembly and often also the sensor assembly are designed in such a manner that they have an adjusting element as well as a coil, wherein the adjusting element is moved in the case of the actuator assembly by a magnetic field of the corresponding activated coil, which leads to the measuring tube being deflected electromagnetically and brought into oscillation. In the case of the sensor assembly, the adjusting element provided with a permanent magnet is deflected by the movement of the measuring tube and an electrical voltage is induced by the movement of the magnet in the coil formed by the windings of the conductor. By evaluating this electrical voltage, the movement of the adjusting element and thus the oscillation of the measuring tube can be detected.

The evaluation of the measuring results occurs in that a phase shift is determined between oscillations detected by two offset sensor assemblies arranged on the measuring tube, wherein this phase shift is a dimension for the mass flow rate. Coriolis mass flowmeter are known that have one, single measuring tube, but also that have a plurality of measuring tubes or exactly two measuring tubes, wherein the measuring tubes are either essentially straight or curved; these constructive differences are not of importance for the present invention.

Coriolis mass flowmeters are resonance-measuring systems, whose measuring tubes are constantly moving as necessary for operation. The elements directly or indirectly in contact with the measuring tubes are thus exposed to continuous vibration, this is true, in particular, for the actuator assemblies as well as for the sensor assemblies. The windings of the first conductor of the actuator assembly finally forming an electrical coil and therefore represent an electrical energy storage. In a cable break in or on the coil caused by constant vibration, it is possible for a break to occur in the conductor, wherein this leads to a flashover due to the constant flow of current in the energy storage. When using Coriolis mass flowmeters in explosive surroundings, suitable measures need to be taken to avoid a flashover in the area of the coil of the actuator assembly of the Coriolis mass flowmeter. In addition to reducing the intensity of the current, which, however, goes hand in hand with a reduction of the intensity of the magnetic field and thus the power for oscillation excitation, such a measure can exist, for example, in casting of the coil, which is complex and increases the costs for production. In particular, in Coriolis mass flowmeters having measuring tubes with a large nominal width or in using Coriolis mass flowmeters with media having strongly damping characteristics, large coils with many windings are used, which have high energy during operation, thus increasing the risk of a flashover.

SUMMARY OF THE INVENTION

Based on the above-mentioned prior art, a primary object of the present invention is to provide a Coriolis mass flowmeter and a method for operating a Coriolis mass flowmeter with which common or even great forces for oscillation excitation can be provided, and at the same time, with which the risk of flashover is reduced.

The above object is met with a Coriolis mass flowmeter of the type being discussed in that the actuator assembly includes at least a second conductor with windings, that the windings of the second conductor are arranged parallel to the windings of the first conductor, that the first conductor and the second conductor are insulated from one another at least in the area of the windings, and that the first conductor and the second conductor are connected in such a manner that the first conductor and the second conductor can be supplied with a current in the same direction in the operating state so that a common magnetic field is created. The advantage of this arrangement is that at least two current paths are formed in this manner and that, in the case of malfunction—series fault—of only one current path, the other current path can prevent a flashover.

Consequently, the first conductor and the second conductor together with their windings form a coil for the actuator assembly, with which the measuring tube or the measuring tubes can be excited to oscillation. The first conductor preferably has essentially circular and spiral-shaped windings, so that a long and essentially circular coil channel is defined by the windings in which the adjusting element can be incorporated. The windings of the second conductor are arranged parallel to the windings of the first conductor, wherein parallel, here, doesn't require a constant parallelism of both conductors, but only means that the windings of the second conductor have an essentially similar orientation as the windings of the first conductor. Thus "parallel" also includes that only one, single winding of the second conductor follows two windings of the first conductor or vice versa in the longitudinal direction of the windings—in the longitudinal direction of the coil channel. The windings of the first conductor and the windings of the second conductor are designed either with only one layer or have a multi-layer construction with a plurality of windings, wherein the number of windings is oriented with respect to the required magnetic field intensity or, respectively, the required force for oscillation excitation. However, it is constantly guaranteed that the first conductor and the second conductor are insulated from one another at least in the area of the windings, i.e., where the magnetic field is created.

The windings of the first conductor and the windings of the second conductor can, on the one hand, be designed freely, so that the windings are supported by their own rigidity, and on the other hand, the windings of the first conductor and/or the windings of the second conductor can be wound around a coil form that supports the windings, and if necessary, guides and positions the first conductor and/or the second conductor and/or stabilizes an insulation between individual winding layers. The coil form can be made, for example, of plastic or ceramic.

The invention is not dependent on the number of measuring tubes of the Coriolis mass flowmeter, so that, for example, one measuring tube, two measuring tubes, four measuring tubes or also more measuring tubes can be included. Furthermore, the number of actuator or respective sensor assemblies is dependent on each application condition and the number of measuring tubes, wherein, for example, one actuator assembly and two sensor assemblies arranged to the right and left of the actuator assembly are normally included in a Coriolis mass flowmeter having two parallel measuring tubes.

The first conductor and the second conductor are connected in such a manner that the first conductor and the second conductor can be supplied with a current in the same direction in the operating state. "Is able to be supplied with a current in the same direction" here means that voltages from one or more voltage sources is/are applied with the same orientation on the input end of the first conductor and the second conductor and the output end of the first conductor and the second conductor, so that the direction of the current in the first conductor and the second conductor is always similarly oriented.

A partial magnetic field is created by the current in the first conductor or by the current in the second conductor in respect to each of the conductors. Due to the parallel and similar-oriented arrangement of the first conductor and the second conductor, the partial magnetic field of the windings of the first conductor and the partial magnetic field of the windings of the second conductor are structurally superimposed so that a common magnetic field is created, which is thus stronger than both of the partial magnetic fields of the first conductor and the second conductor.

The design according to the invention has the advantage that an overall large wire cross section can be implemented with the conductors running parallel to, and, in the scope of the invention, similarly-oriented windings. Thus, a greater total current within the coil defined by the windings of the first and second conductors is achieved, wherein a relatively large magnetic field can be generated due to the large current sum, with which even measuring tubes having a large nominal diameter or highly damping media can be reliably excited to oscillation. At the same time, however, the risk of flashover due to material failure is substantially decreased, since the individual currents do not have to be increased in the conductors in order to increase the intensity of the magnetic field. If only one of the at least two conductors malfunctions, the current flow is not entirely interrupted, so that this does not lead to spark formation.

By providing the two conductors parallel to one another, encapsulation or casting of the coil is not necessary, wherein application of the Coriolis mass flowmeter is still possible in surroundings at risk of explosion since sparking does not occur when a conductor malfunctions. Furthermore, the invention has the advantage that the conductor does not require a special material, rather standard materials, e.g., usual copper alloys, can also be used for increased temperatures. The diameter of the conductor can also have a standard measure, so that an arbitrary number of windings can be implemented, wherein a great magnetic action of force and reliable protection against flashover are simultaneously guaranteed.

To further increase the intensity of the magnetic field and for additionally decreasing the susceptibility to flashover, it is provided by an advantageous design that at least one further, third conductor is provided with windings parallel to the windings of the first conductor and to the windings of the second conductor. The third conductor is insulated at least in the area of the windings from the first conductor and from the second conductor.

The third conductor is also connected in such a manner that it can be supplied with a current during operation like the first conductor and the second conductor, so that the three partial magnetic fields of the first, second and third conductors are structurally superimposed into one common magnetic field. For this, the windings of the third conductor are arranged next to the windings of the first conductor and the second conductor, wherein here the parallelism of the conductor does not have to mean that the conductors are completely parallel to one another, rather that it is also possible of one or more conductors have a different diameter than the windings if the other conductor(s), or it is also possible that only one winding of the third conductor follows every two windings of the first conductor and the second conductor or vice versa. This design has the advantage that overall a very large total cross section of the conductor can be achieved, wherein a greater current sum is present, while the risk of a flashover is reduced during malfunction of a conductor.

In order to guarantee formation of the partial magnetic fields of the first conductor and the second conductor, the first conductor and the second conductor are insulated from one another at least in the area of the windings. According to a preferred design, it is provided that the first conductor or the second conductor are insulated, or alternately the first conductor and the second conductor have insulation. Depending on the construction of the actuator assembly, it can be sufficient if only one of the two conductors has insulation so that the first conductor and the second conductor are insulated from one another in the area of the windings. This is particularly suitable for designs in which a winding of the first conductor alternates with a winding of the second conductor so that insulating one of the two conductors is sufficient. Preferably, a further insulator for electrically insulating the layers from one another is provided between individual winding layers that are arranged above one another. In particular, at large current intensities and other sequences of windings, it is advantageous when both conductors, i.e., the first conductor and the second conductor, have insulation. This design always guarantees a reliable insulation of the conductors from one another.

A particularly advantageous superimposition of the partial magnetic fields of the first conductor and the second conductor can be achieved when, according to an advantageous design, the number of windings of the first conductor corresponds to the number of windings of the second conductor. Consequently, there is a corresponding winding of the second conductor for each winding of the first conductor, so that the partial magnetic fields of the first conductor and the second conductor advantageously complement one another. As an alternative to this design, it is provided according to a further design that the number of windings of the first conductor and the number of windings of the second conductor are different. Such a design is essentially possible with completely identical conductors, but has been seen to be of particular advantage when the first conductor and the second conductor are made of different materials and/or have a different geometry, for example, the second conductor having a larger cross section than the first conductor. With this sort of differing geometry of the first conductor and the second conductor, there are proportionally more windings from the conductor having a smaller cross section that from the conductor having a larger cross section.

The first conductor and the second conductor are insulated from one another at least in the area of the windings, and for example, are connected to a common voltage source or to two separate voltage sources, so that the same or also different voltages can be assigned to the first conductor, or respectively, the second conductor.

It has been shown to be of particular advantage, according to a further design, when at least the input ends of the first conductor and the second conductor and the output ends of the first conductor and the second conductor are electrically connected to one another. Input ends and output ends are not to been understood definitively, since the direction of current flow changes depending on the operation mode and during operation. According to the present design, the input ends of the first conductor and the second conductor and also the output ends of the first conductor and the second conductor are connected to a common voltage source, so that, in particular, at identical spatial geometric design and arrangement of the first conductor and the second conductor, two identical partial magnetic fields are generated, which are structurally superimposed on one another. Due to the galvanic coupling of the first conductor and the second conductor in this variation, a particularly simple and reliable protection against flashover is guaranteed when one of the two—or more—conductors malfunctions.

The object mentioned above is further achieved with a method of the type being discussed here for operating a Coriolis mass flowmeter, in that the first conductor and the second conductor can be at least intermittently supplied with a current in the same direction, so that a common magnetic field is generated. The first conductor and the second conductor are supplied in this manner with the same or with different currents, so that a current is formed in each of the first conductor and the second conductor, wherein the flow direction of the current in the first conductor is always identical to the flow direction of the current in the second conductor, so that the partial magnetic fields generated in the first conductor and the second conductor can be structurally superimposed on one another and form a common magnetic field. That the first conductor and the second conductor are supplied "at least intermittently" in the same direction with a current means that both conductors do not always have a current flowing through them, rather there are operational situations in which only one of the conductors is used to generate a magnetic field. When both conductors have a current—of the same or different intensities—flowing through them, the flow direction is, however, identical, i.e., the input ends and the output ends of the first conductor and of the second conductor are always—regardless of the actual direction of the flow of current in each operational situation—located at the same end of the coil.

Flexible adaptation of the structurally superimposed partial magnetic fields of the first conductor and the second conductor can be achieved advantageously according to a further design of the invention in that the current in the first conductor is regulated independent of the current in the second conductor. The first conductor and the second conductor are driven by different voltage sources here, so that same or different current intensities can be set independently from one another in both conductors. Due to such a flexible adaptation of the first conductor and the second conductor, the characteristics of the actuator assembly can always be adapted to the external conditions and in particular to the medium flowing in the measuring tube(s) even during operation of the Coriolis mass flowmeter and the energy for oscillation excitation created by the magnetic field is adapted as required.

In order to adapt the intensity of the magnetic field of the individual partial magnetic fields and in particular for regulating the common magnetic field of the superimposed partial magnetic fields, it is provided according to a further design of the method that different current intensities are set in the first conductor and in the second conductor. The first conductor and the second conductor are connected here to two separate voltage sources so that different current intensities can be set in the conductors. The generated partial magnetic fields of differing intensities are structurally superimposed into one common magnetic field.

Depending on which action of force is required for operating the Coriolis mass flowmeter and on whether the characteristics of the medium flowing in the measuring tube change during operation of the Coriolis mass flowmeter, it has been seen to be advantageous according to a further design when the first conductor and the second conductor are supplied with a current at staggered times. In this manner, it is possible that the full force of action of the cumulated common magnetic field is not necessary from the beginning of operation of the Coriolis mass flowmeter, rather it is initially sufficient for a magnetic field to be generated by only one conductor, wherein the second conductor is also subsequently supplied with a current if additional action of force is required. Further, it is possible that the characteristics of the medium change during operation of the Coriolis mass flowmeter so that it is necessary that the second conductor be additionally supplied with a current, so that both partial magnetic fields are structurally superimposed on one another and a total magnetic field is created with a greater intensity or, for example, a conductor can be switched without a current. Furthermore, it is also provided that one of the conductors is switched slightly later or downstream when the flow direction is changed periodically, so that damping is implemented as required.

In order to increase the flexibility of the Coriolis mass flowmeter in respect to changing the characteristics of the medium flowing in the measuring tube, it is provided by a further preferred design that the intensity of the current in the first conductor and the intensity of the current in the second conductor are controlled depending on the medium flowing in the measuring tube and/or depending on the state of the medium. The different damping characteristics of the Coriolis mass flowmeter with different media or the different damping characteristics of the same medium in different states, in particular two-phase flow, are taken into account in that the current intensity in the conductors is controlled depending on the flowing medium or the state of the flowing medium so that flexible adaptation of the energy needed for oscillation excitation of the measuring tube is easily possible in that the current intensity is adapted in both conductors so that a consistent and defined excitation of the measuring tube or measuring tubes to oscillation is guaranteed. The evaluation of the medium characteristics and the adaptation of the current intensity within the first and second conductors can be carried out by the measuring and evaluating electronics provided in a Coriolis mass flowmeter anyway.

The actuator assembly and sensor assembly are designed essentially identically in respect to their actual components so that basically each actuator assembly can be switched during operation in such a manner that it can be used as a sensor assembly. According to a further design, it has thus been shown to be advantageous when the actuator assembly is used as a sensor assembly, at least from time to time, and that when the actuator assembly is used as a sensor assembly, only the windings of the first conductor or the windings of the second conductor are used. When the actuator assembly is used as an actuator assembly, namely for exciting the measuring tubes to oscillation, a large action of force of the actuator assembly is often required, in particular in strongly damping media, which is why the use of two conductors running parallel to one another, whose magnetic fields make up one common magnetic field, is advantageous. In order to detect the oscillation of the measuring tube or measuring tubes, it can be sufficient when the oscillations are only evaluated by one or both conductors.

In order to increase the reliability of the evaluation of the sensor assembly, it is further provided according to a last design of the method that the windings of the first conductor or the windings of the second conductor are used alternatingly. Here, when the actuator assembly is used as a sensor assembly, not only the windings of one conductor are always used for evaluation, but alternately, either the windings of the first conductor or the windings of the second conductor are used for that purpose. This design of the method has the advantage that two independent measurement results are obtained, which can be examined and evaluated relative to one another, which leads to increasing the reliability of the Coriolis mass flowmeter.

Furthermore, the invention also relates to a coil having a first conductor with windings that is characterized in that there is at least a second conductor with windings, that the windings of the second conductor are arranged parallel to the windings of the first conductor and that the first conductor and the second conductor are insulated from one another at least in the area of the windings. Such a coil is particularly suitable for use in a previously described Coriolis mass flowmeter and also for carrying out the previously described method. All of the advantages described for the Coriolis mass flowmeter according to the invention can be achieved using such a coil.

According to a design of the coil, it is provided that the first conductor and the second conductor are also insulated from one another at the output end of the conductor so that the coil can be connected to two separate voltage sources and the current in the first conductor can be controlled separate from the current in the second conductor.

It is further provided, as an alternative to the previous design, that the first conductor and the second conductor are electrically connected at the input ends and at the output ends. This design is particularly suitable when the first conductor and the second conductor are to be connected to one, common voltage source, so that when the geometry and number of windings are the same, two identical partial magnetic fields are created which are structurally superimposed into one common magnetic field.

In detail, there are numerous possibilities for designing and further developing the Coriolis mass flowmeter according to the invention and the method for operating a Coriolis mass flowmeter according to the invention as will be apparent from the following description of preferred embodiments in conjunction with the accompanying drawings.

DETAILED DESCRIPTION OF THE INVENTION

Figure 1:
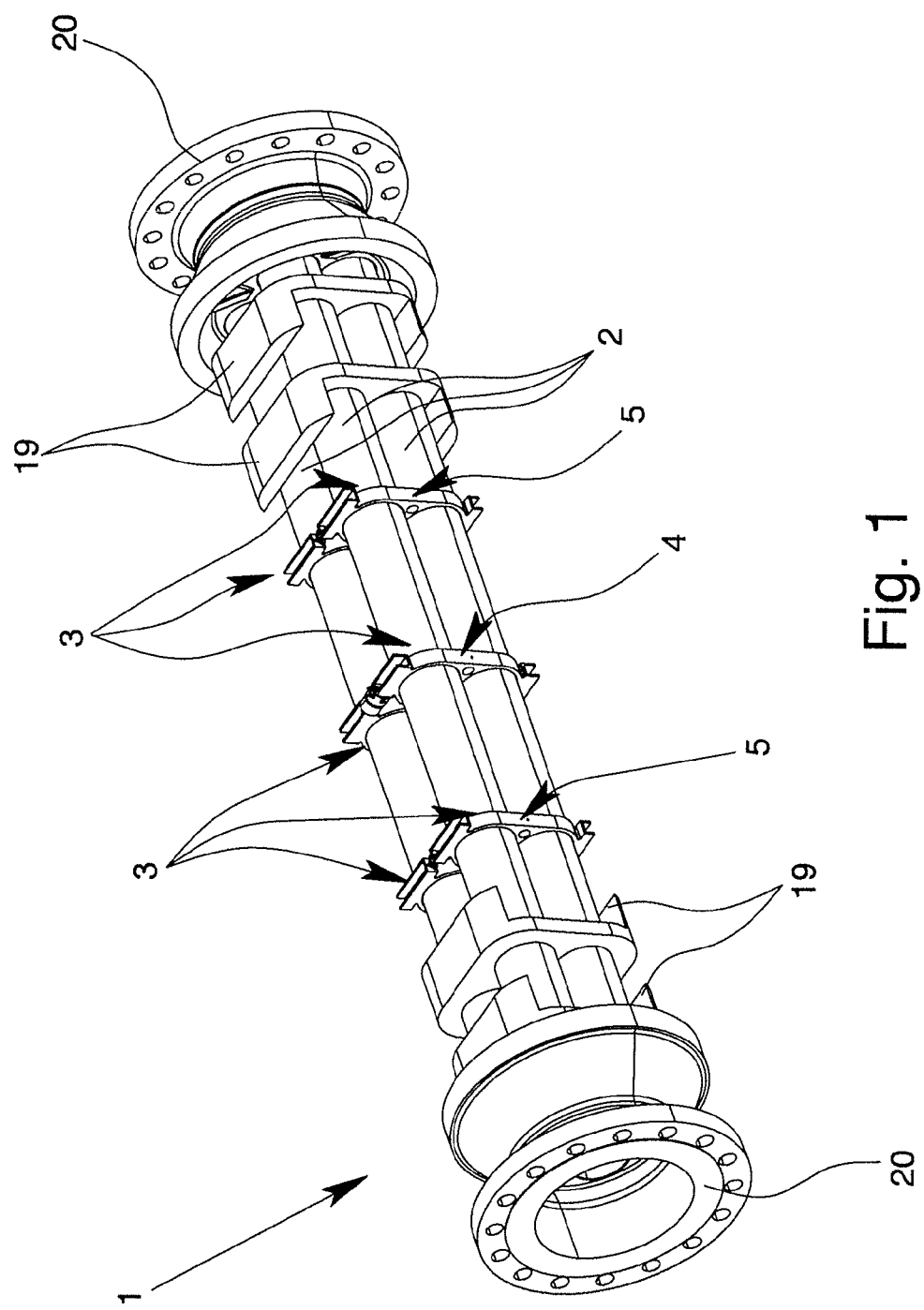
FIG. 1 is a perspective view of an embodiment of a Coriolis mass flowmeter according to the invention.

FIG. 1 shows a Coriolis mass flowmeter 1 with four straight measuring tubes running parallel 2. In this Coriolis mass flowmeter 1, two measuring tubes 2 are each combined into oscillation units using holding devices 3, which are excited to acceleration offset from one another during operation. The oscillation excitation of the two oscillation units occurs using an actuator assembly 4 that comprises two holding devices 3 that are arranged in opposition to each other, which hold the further components of the actuator assembly 4. The detection of the oscillation of the measuring tubes 2, or respectively, the oscillation units, is achieved using two sensor assemblies 5 that are arranged upstream and downstream from the actuator assembly 4 and which also comprises two holding devices 3 that are arranged in opposition to each other and which hold the further components of the sensor assembly 5.

Figure 2:
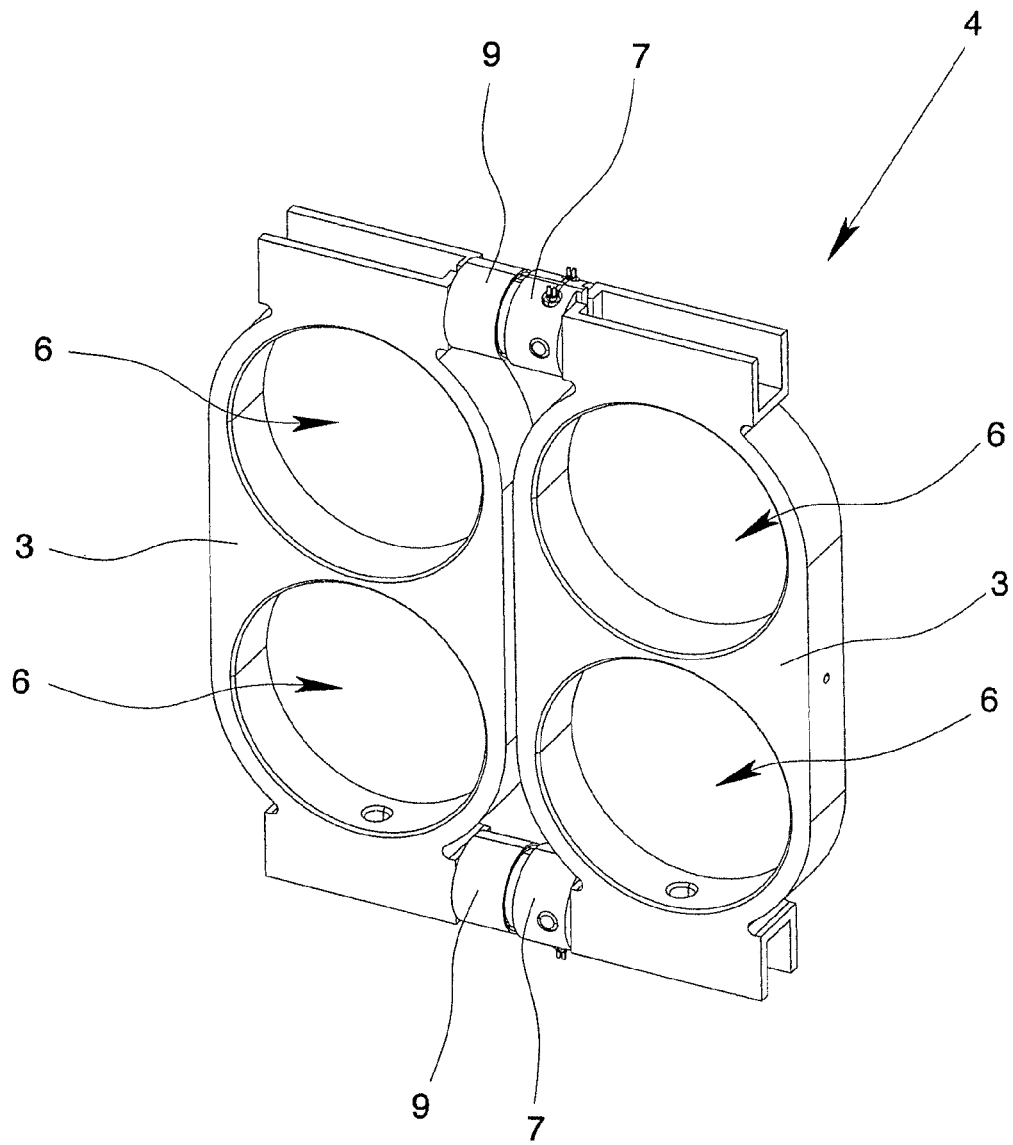
FIG. 2 is a perspective view of an actuator assembly for a Coriolis mass flowmeter.

FIG. 2 shows an embodiment of an actuator assembly 4. having two holding devices 3. The holding devices 3 are pushed onto the measuring tubes 2 using recesses 6 and are attached to the measuring tubes 2, wherein each holding device 3 combines two—shown in FIG. 1—measuring tubes 2 into one oscillation unit. In order to excite the oscillations of the measuring tubes 2 relative to one another, or respectively, the oscillation units relative to one another, a coil 10—shown in FIG. 3—arranged in a coil housing 7 is provided above and below the measuring tube 2, the coil 10 interacting during operation with an adjusting element 8—shown in FIG. 3—that is arranged in a sheath 9.

Figure 3:
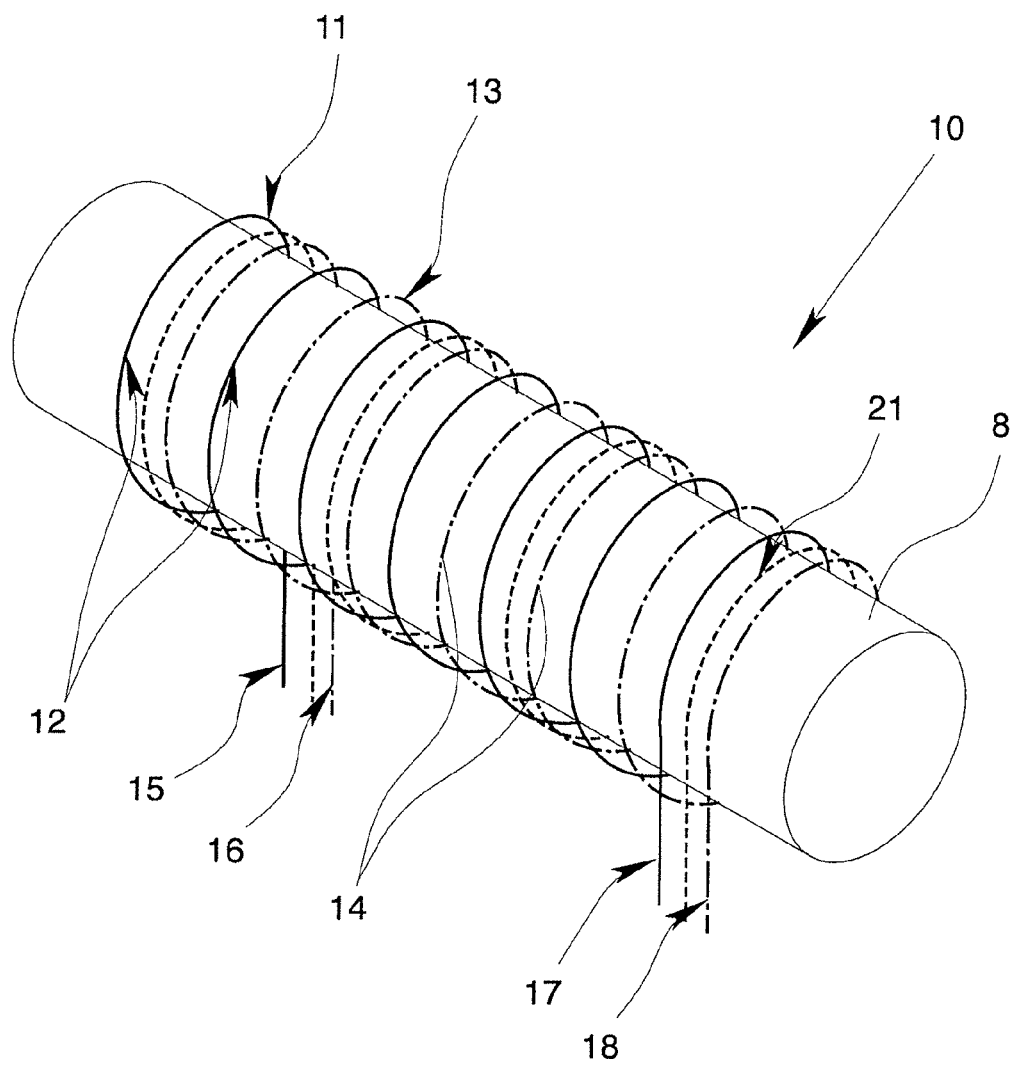
FIG. 3 is a perspective view of an embodiment of a coil having a first conductor and a second conductor together with an adjusting element.

FIG. 3 shows a schematic embodiment of a coil 10 having a first conductor 11 with windings 12 and a second conductor 13 with windings 14 together with an adjusting element 8. For the sake of differentiation, the first conductor 11 in FIG. 3 is shown as a solid line and the second conductor 13 is shown as a dot-dash line; the first conductor 11 and the second conductor 13 are, however, geometrically completely identical and are made of the same material in this embodiment.

The windings 12 of the first conductor 11 and the windings 14 of the second conductor 13 run parallel to one another, are circular and define a coil channel, within which the adjusting element 8 is moved during operation by the common magnetic field of the first conductor 11 and the second conductor 13. The first conductor 11 and the second conductor 13 are mounted in such a manner in the assembled state of the Coriolis mass flowmeter that a voltage source is mounted on the input end 15 of the first conductor 11 and the input end 16 of the second conductor 13, or respectively, on the output end 17 of the first conductor or on the output end 18 of the second conductor 13 in such a manner that a current flows through the first conductor 11 from the input end 15 in the direction of the output end 17 and through the second conductor 13 from the input end 16 to the output end 18—i.e., the first conductor 11 and the second conductor 13 in the same direction—wherein a partial magnetic field is created in each the area of the windings 12 of the first conductor 11 and the area of the windings 14 of the second conductor 13 and both partial magnetic fields of the first conductor 11 and the second conductor 13 are structurally superimposed into a common magnetic field, which has a greater intensity than both partial magnetic fields. The adjusting element 8 is moved in the coil channel of the coil 10 due to the effect of the magnetic field, through which a relative movement of the measuring tubes with respect to one another is caused since the coil 10—according to FIG. 2—is located on one holding device 3 and the adjusting element 8 is located on the opposite holding device 3.

The specification of the input end 15 of the first conductor 11 or the input end 16 of the second conductor 13 or the output end 17 of the first conductor 11 or the output end 18 of the second conductor 13 are not to be viewed as absolute, since the direction of the current is periodically changed during operation of the Coriolis mass flowmeter 1 in order to cause oscillation of the measuring tubes 2 relative to one another.

The embodiment of a Coriolis mass flowmeter 1 according to FIG. 1 further comprises two node plates 19 on each of the input end and the output end that join all four measuring tubes 2 to one another and prevent a de-coupling of the oscillations of the measuring tubes 2 to the pipe system—not shown—surrounding the Coriolis mass flowmeter 1 and, conversely, also prevent coupling of the oscillations coming from the pipe system with the Coriolis mass flowmeter 1. Furthermore, flange devices 20 are provided on the input side and the output side, which, on the one hand, serve as a collector and are also provided for attaching the Coriolis mass flowmeter 1 to the pipe system.

To further increase the intensity of the magnetic field and for additionally decreasing the susceptibility to flashover, in a further embodiment, it is provided that at least one further, third conductor 20 is provided with windings (shown in dash lines) parallel to the windings 12 of the first conductor 11 and to the windings 14 of the second conductor 13. The third conductor 21 is insulated, at least in the area of the windings 12, 14, from the first conductor 11 and from the second conductor 12.

The third conductor 20 is also connected in such a manner that it can be supplied with a current during operation like the first conductor 11 and the second conductor 13, so that the three partial magnetic fields of the first, second and third conductors are structurally superimposed into one common magnetic field. For this, the windings of the third conductor 20 are arranged next to the windings 12, 14 of the first conductor 11 and the second conductor 13, wherein here the parallelism of the conductor does not have to mean that the conductors are completely parallel to one another, rather that it is also possible of one or more conductors have a different diameter than the windings if the other conductor(s), or it is also possible that only one winding of the third conductor follows every two windings of the first conductor and the second conductor, as shown in FIG. 3, or vice versa. This design has the advantage that overall a very large total cross section of the conductor can be achieved, wherein a greater current sum is present, while the risk of a flashover is reduced during malfunction of a conductor.

Figure 4:
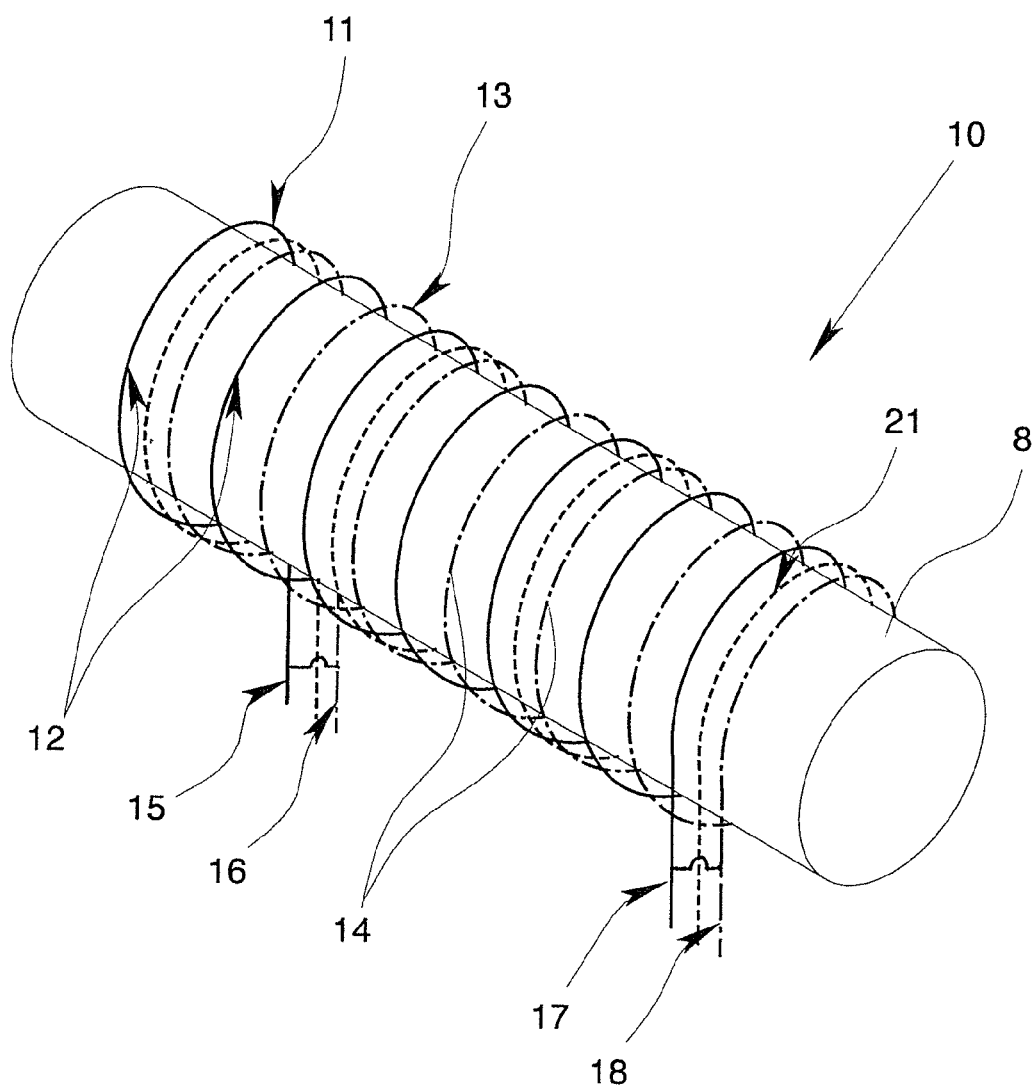
FIG. 4 is a perspective view similar to that of FIG. 3, but showing an embodiment in which output ends of the first and second conductors are electrically connected to one another.

It is further provided, as shown in FIG. 4, an alternative to the previous design, in which the input end 15 of the first conductor 11 and the input end 16 of the second conductor 13 as well as the output end 17 of the first conductor 11 and output end 18 of the second conductor are electrically connected. This design is particularly suitable when the first conductor and the second conductor are to be connected to one, common voltage source, so that when the geometry and number of windings are the same, two identical partial magnetic fields are created which are structurally superimposed into one common magnetic field.

What is claimed is:

1. A method of operating a Coriolis mass flowmeter having at least one flow measuring tube and at least one actuator assembly that comprises at least windings of a first conductor and parallel-running windings of a second conductor for producing oscillation of the at least one flow measuring tube, wherein the first conductor and the second conductor are insulated from one another at least in an area of the windings, comprising the steps of:
supplying the first conductor and the second conductor with current that is at least temporarily in the same direction in the operating state,
creating a common magnetic field combining magnetic fields produced by the first conductor and the second conductor in a manner increasing magnetic intensity while reducing susceptibility to flashover.

2. The method for operating a Coriolis mass flowmeter according to claim 1, wherein the current in the first conductor is controlled independent of the current in the second conductor.

3. The method for operating a Coriolis mass flowmeter according to claim 1, wherein different current intensities are set in the first conductor and the second conductor.

4. The method for operating a Coriolis mass flowmeter according to claim 1, wherein the first conductor and the second conductor are supplied with a current at different, staggered times.

5. The method for operating a Coriolis mass flowmeter according to claim 1, wherein the current intensity in the first conductor and the current intensity in the second conductor are controlled depending on at least one of the medium flowing in measuring tube and the state of the medium.

6. The method for operating a Coriolis mass flowmeter according to claim 1, wherein the actuator assembly is used at least temporarily as a sensor assembly and wherein when using the actuator assembly as a sensor assembly, only the windings of one of the first conductor and the second conductor are used.

7. The method for operating a Coriolis mass flowmeter according to claim 6, wherein the windings of one of the first conductor and the second conductor are used alternatingly.

8. The method for operating a Coriolis mass flowmeter according to claim 1, wherein, in said creating step, the said current supplied in the same direction in the operating state structurally superimposes partial magnetic fields of the conductors into one common magnetic field.

9. A coil for a Coriolis mass flowmeter having at least one flow measuring tube, comprising:
a first conductor with windings and
at least a second conductor with windings,
wherein, as a means for increasing magnetic intensity while reducing susceptibility to flashover, the windings of the second conductor are arranged parallel to the windings of the first conductor and the first conductor and the second conductor are insulated from one another at least in an area of the windings, thereby enabling a common magnetic field to be produced combining magnetic fields of the first conductor and the second conductor when producing oscillation of said at least one flow measuring tube in use, and wherein the first conductor and the second conductor are electrically connected at input ends and at output ends thereof.

\* \* \* \* \*